No. 758,853. Patented May 3, 1904.

UNITED STATES PATENT OFFICE.

THOMAS ROUSE, OF STAMFORD HILL, ENGLAND, ASSIGNOR OF ONE-HALF TO HERRMANN COHN, OF LONDON, ENGLAND.

METHOD OF CONVERTING IRON-SAND INTO BRIQUETS OR LUMPS.

SPECIFICATION forming part of Letters Patent No. 758,853, dated May 3, 1904.

Application filed October 27, 1903. Serial No. 178,776. (No specimens.)

*To all whom it may concern:*

Be it known that I, THOMAS ROUSE, a British subject, residing at 7 Old Hill street, Stamford Hill, in the county of Middlesex, England, (whose post-office address is 7 Old Hill street, Stamford Hill, London, N., England,) have invented a new and useful improved method of converting into briquets or lumps iron-sand, whether natural or prepared, by reducing to powder iron ore or iron wastes, of which the following is a specification.

I am aware that numerous attempts have been made to utilize iron-sands, powdered iron ore, powdered iron wastes—such as "blue-billy," rich slags, and the like—in the manufacture of iron and that patents have been granted for various inventions in which such sands, ores, and wastes have been mixed together and with other substances, such as lime, carbon, peat, and with various earths, minerals, and chemicals. Such mixtures have been rendered plastic for molding by the use of tar, clay, sludge, mucilage, pyroligneous acid, and soap refuse. It has been proposed to use the blocks thus prepared in their plastic condition in the furnace or to harden them by exposure to the vapor of water at from 196° to 212° Fahrenheit in a closed chamber from four to six days or to bake them at temperatures of from 372° to 932° Fahrenheit or to add sufficient coal and by coking the mixture produce what has been termed an "iron-coke" or simply to let the lumps dry naturally in a dry place.

The object of this invention is to convert iron-sand concentrates into briquets or lumps, whether the sand dealt with is a natural sand or one artificially prepared by the reduction and concentration of iron ore or iron wastes or whether it be a mixture of such sands, and is more especially for effecting the conversion into briquets without the addition of lime or any other substance than a soluble silicate or silicates, preferably commercial water-glass, as a binding medium, so that the briquets made of the sand where the latter is produced and concentrated may contain the largest possible percentage of iron, with a view to the saving of freight and handling charges.

The sand is thoroughly mixed with a solution of about one measure of commercial water-glass in fifty measures of hot water. During the process of mixing the heat may, if necessary, be kept up and, further, water-vapor added by injecting steam or by spraying with hot water and by heating the mixer in any suitable way. The quantity of the water-glass solution must be such that when cooled the mixed mass is in a stiff plastic condition, although gritty, so that it can be molded by hand or by any suitable machine into briquets, which when pressed are sufficiently stable to be conveyed by a carrier-belt or upon plates or in any suitable way to a drying-chamber, in which they are hardened. The hardening is effected by placing the molded lumps in a chamber through which hot air and steam are passed. The atmosphere of the chamber must be kept uniformly hot and contain some water-vapor. The hot-air supply and the steam-supply are kept under control by means of valves in such way that the atmosphere of the chamber can be prevented from becoming fully saturated with vapor at atmospheric pressure. Condensation of steam in the chamber is thus prevented. The chamber may be constructed of brickwork, with doors or shutters which can be more or less opened to regulate the escape of hot air and steam, as may be desirable. The object is to secure a constant circulation of a mixture of hot air and steam in and through the chamber without condensation of vapor therein. The air may be heated in any known way, and the current through the chamber may be caused by means of a blower or of a blast-fan or of an exhaust-fan, or a jet or jets of steam may be arranged to cause the injection of air. The waste air and gas from a steam-boiler flue or from a blast or other furnace may be used in the chamber.

The employment of a mixture of hot air and steam in such way as to prevent the air becoming fully saturated with moisture causes the blocks of concentrated iron-sand moistened as aforesaid with water-glass solution to harden in from one to ten hours, according to the temperature maintained in the chamber and the shape and size of the blocks. For such concentrated iron-sand blocks the temperature of the chamber may be raised to upward of 1,000° Fahrenheit, and in that case little or no steam is needed, the water-vapor present in the atmosphere or in the products of combustion from boilers or furnaces used to heat the chamber being sufficient.

If desired, lime or materials for fluxing or ores or materials for purifying the iron when the briquets are being reduced in the furnace may be incorporated with the sand when it is being mixed. In such cases the blocks must remain longer in the hardening-chamber. Considerably more steam is used, and a temperature from about 200° to 350° Fahrenheit is preferable. At this lower temperature the atmosphere of the chamber may be prevented from becoming fully saturated with vapor by superheating the steam before it is injected into the chamber.

What I claim as my invention, and desire to secure by Letters Patent, is—

The process of agglomerating by means of solution of water-glass and hardening into lumps or hard blocks, iron-sand, powdered iron ore or blue-billy or the like, or mixtures thereof, by means of a mixture of hot air and steam at atmospheric pressure in a ventilated chamber, in which condensation of the steam into a deposit of water of condensation is prevented by regulating the supply of hot air and steam and the ventilation; all as hereinbefore described.

In testimony whereof I have signed my name to this specification, in presence of two subscribing witnesses, this 14th day of October, 1903.

THOMAS ROUSE.

Witnesses:
THOS. WILKINS,
DAVID J. MOCKRIDGE.